United States Patent [19]

Touhsaent

[11] Patent Number: 4,794,136

[45] Date of Patent: Dec. 27, 1988

[54] PRIMER FOR PVDC TOPCOATS ON OPP FILM

[75] Inventor: Robert E. Touhsaent, Fairport, N.Y.

[73] Assignee: Mobil Oil Corporation, New York, N.Y.

[21] Appl. No.: 342

[22] Filed: Jan. 5, 1987

[51] Int. Cl.$^4$ .............................................. C08L 61/00
[52] U.S. Cl. .................................... 524/512; 525/162; 525/163; 428/516
[58] Field of Search ...................... 524/512, 558, 560; 525/162; 428/516

[56] References Cited

U.S. PATENT DOCUMENTS 4,214,039 7/1980 Steiner et al. ........................ 428/414
4,524,173 6/1985 Rehfuss et al. ...................... 524/512

Primary Examiner—Theodore E. Pertilla
Attorney, Agent, or Firm—Alexander J. McKillop; Michael G. Gilman; Howard M. Flournoy

[57] ABSTRACT

A PVDC topcoated, flexible multilayer heat sealable modified OPP film having as a primer an acrylic emulsion crosslinked with a water soluble melamine resin.

6 Claims, No Drawings

PRIMER FOR PVDC TOPCOATS ON OPP FILM

BACKGROUND OF THE INVENTION

This invention relates to a flexible multilayer heat sealable general packaging film and to a method of forming the same and to a primer suitable for use therewith.

In the packaging of certain types of snack foods, for example, corn-based products and potato chips, it is common practice to employ a multilayer film having two or more polymeric layers wherein one of the layers is known to be an effective heat seal layer. In the packaging process a supply of such a multilayer film is shaped into a tube in a vertical form and fill machine. Marginal regions of the heat seal layer are brought in face to face relationship and sealed together. Thereafter the packaging machine automatically forms a heat seal and makes a horizontal severance across the bottom of bag; product is dispensed into the open end of the tube and thereafter a second horizontal heat seal is effected across the tube with a simultaneous severing through the tube to result in a product packaged in a tube heat sealed at both ends and along one seam at right angles to the end seals. While the snack food or other product is being dispensed into the package, air also is present in the package and this air assists in protecting and cushioning the product during subsequent shipment of the finished packages. During shipment of the product, particularly with larger sized bags, e.g., those containing 16 ounces of product, the bags have a tendency to split or burst at the end seals.

A multilayered wrapping film of the type having the above mentioned utility is described in U.S. Pat. No. 4,214,039, the subject matter of which is, in its entirety, incorporated by reference herein. This patent describes a packaging film structure comprising a polypropylene film substrate having a heat sealable vinylidene chloride polymer containing at least 50% by weight of vinylidene chloride. Intermediate the polypropylene film and the vinylidene chloride polymer is a primer coat which consists of the reaction product of an acidified aminoethylated vinyl polymer and an epoxy resin. This primer coat significantly enhances the bond strength between the polypropylene and the heat sealable vinylidene chloride polymer. While this packaging material is effective for the packaging of comparatively small quantities of product, there is a need to increase its seal strength when used, for example, for the packaging of comparatively large quantities of product. It has now been discovered that a primer coat consisting of the reaction product of an acrylic interpolymer, a water-soluble partially alkylated melamine formaldehyde resin and an acid catalyst unexpectedly provide an attractive and significantly improved alternative to the prior art.

SUMMARY OF THE INVENTION

In accordance with the present invention, an oriented heat sealable structure is provided which comprises:
(a) a substrate comprising a polyolefin film;
(b) optionally a coextruded layer on at least one surface of (a), said layer consisting essentially of a random copolymer or terpolymer preferably of ethylene and propylene and ethylene, propylene and butene-1, respectively, or other α-unsaturated olefins, said polymers containing from about 0.5 to about 6% by weight of monomers other than propylene, said substrate and said coextruded layer(s) being biaxially oriented;
(c) a primer coating on at least one surface of said substrate; said layer(s) consisting of the reaction product of an acrylic emulsion interpolymer, a water soluble partially alkylated melamine formaldehyde resin and a suitable acid catalyst; and
(d) a heat sealable layer on said primer coating (c), said heat sealable layer comprising a vinylidene chloride copolymer containing at least 50% by weight of vinylidene chloride.

More specifically, the structure preferably comprises:
(a) A biaxial oriented polyolefin, such as polypropylene, base layer.
(b) Ethylene-propylene random-copolymer layer coextruded and oriented with the polyolefin, base layer and
(c) An acrylic/melamine primer layer coated on the treated ethylene-propylene coextruded copolymer layer.
(d) A PVDC topcoat layer applied to the acrylic/melamine primer.

A critical aspect of the present invention resides in making the acrylic/melamine primer and in the discovery and making of a suitable acrylic emulsion interpolymer having the desired properties as, for example, adhesion and heat sealability; and to formulate a PVDC topcoat that would work with this primer. Strong seals (above 500 g/in) which hold up well in high humidity and at the same time obtain a broad sealing range and good hot tack are provided for films in accordance with this invention. Previously all of these could not be obtained at the same time in a film structure.

DESCRIPTION OF THE PREFERRED EMBODIMENTS

The polyolefins contemplated as the substrate or core material of the subject film structure include polyethylene, polypropylene, polybutene and copolymers and blends thereof. Particularly preferred is an isotactic polypropylene containing at least 80% by weight of isotactic polypropylene. It is preferred that the polypropylene have a melt flow index of from about 2 to 8 g/10 minutes. An especially preferred form comprises homopolymer polypropylene interblended with from 0 to about 15 parts by weight of said copolymer.

The ethylene propylene random copolymers contemplated herein are conveniently formed by the simultaneous polymerization of the respective monomers. Effective formation of a random copolymer of ethylene and propylene is accomplished when the ethylene is present simultaneously with the propylene in an amount sufficient to result in from 0.5 to about 6% by weight of ethylene in the resulting copolymer. This system is characterized by random placement of the respective monomer units along the polymer chain. This is in contrast with a block copolymer of ethylene and propylene formed by sequential polymerization of the respective monomers. The feeding of the monomers in forming a block copolymer is controlled so that the monomer employed in one stage of the sequential polymerization is not added until the monomer employed in the preceding stage has been at least substantially consumed thereby insuring that the concentration of the monomer remaining from that preceding stage is sufficiently low to prevent formation of an excessive proportion of soluble random copolymer.

The primer of the present invention consists of three main components:

1. Acrylic Emulsion Interpolymer

An emulsion interpolymer is made by any convenient means and consisting mainly of methyl acrylate (MA), methyl methacrylate (MMA), and hydroxyethyl methacrylate (HEMA). Optionally minor amounts of methacrylic acid (MAA) and a liquid epoxy prepolymer may be added to the interpolymer. Control of the resulting interpolymer's glass transition by adjusting the amount of MA/MMA and the emulsion particle size provides the right balance of properties for a primer.

2. Curing Agent

A water soluble partially alkylated melamine formaldehyde resin is added to the acrylic emulsion as a curing agent. It reacts with the hydroxyl groups pendent on the HEMA and MAA monomer included in the acrylic interpolymer.

3. Catalyst

An acid catalyst, such as para-toluene sulfonic acid (pTSA).

MA, MMA, HEMA and MMA can be prepared in any convenient manner or obtained through normal commercial channels. Liquid epoxy prepolymers are commercially available. Preferred is diglycidyl ethers of bisphenol A (common name for 4,4'-isopropylidene bisphenol). Particularly preferred is Epon 828.

The emulsion interpolymer itself is conveniently prepared by a semi-continuous batch process. A suitable reactor is charged with water, initiator, e.g., ammonium persulfate, and emulsifier, e.g., sodium lauryl sulfate. A mixture of the desired proportions of monomer, e.g., MA, MMA, HEMA, and MAA, chain transfer agent, e.g., IOTG and prepolymers, e.g., Epon 828, are added over 30 min. to 10 hours, preferably 2 hours. The reaction temperature may vary from about 70° to 90° C. or more and preferably is about 80° C. The Tg is lowered by adding more MA and less MMA, mol. weight is lowered by adding more chain transfer agent and the particle size is lowered by adding more emulsifier.

Suitable catalysts include but are not limited to the following: phosphoric acid, hydrochloric acid, sulfuric acid, acetic acid, para-toluene sulfonic acid, or salts of these acids such as sodium lauryl sulfate. Preferred is para-toluene sulfonic acid.

The acrylic emulsion interpolymer consists of from about 20 to 100 wt.% of MA; from about 20 to 100 wt.% MMA; and from about 0 to about 30 wt.% HEMA. When the liquid prepolymer is used it can amount to from about 0 to about 30 wt.% of the total composition.

In preparing the multiple structure of the present invention, the polypropylene and the ethylene propylene copolymer is coextruded so that the ethylene propylene copolymer layer is from about 2 to about 12% of the total thickness of the two layers. For some purposes, a layer of the copolymer can be on both surfaces of a core layer of polypropylene, in which case the two copolymer layers would amount to from 4 to 24% of total thickness of the layers.

It has been found that heat seal layers, such as vinylidene chloride copolymer heat seal layers, do not adhere well to polypropylene film surfaces even when the latter have been subjected to well known pretreatment operations such as, for example, treatment by corona discharge, flame, or oxidizing chemicals. The same has been found to be true in adhering the heat seal layers contemplated herein to the surface of the ethylene propylene copolymer. However, it has been found that the use of primers intermediate between the ethylene propylene copolymer and the heat seal layer provides an unexpectedly high level of adherence.

The primer materials contemplated for enhancing the bond between the ethylene propylene copolymer and the vinylidene chloride copolymer heat seal is the acrylic/melamine water-based primer disclosed here. A variation of the primer component is one in which a minor amount of an epoxy resin is incorporated into the primer materials.

The primer coating may be applied to the film substrate as a dispersion or as a solution, from an organic vehicle, for example, an alcohol or an aromatic hydrocarbon, such as xylene or a mixture thereof.

In one embodiment of the present invention a liquid partially alkylated melamine formaldehyde resin is emulsified in a solution of the acrylic emulsion interpolymer agent by rapid stirring, the resultant dispersion is diluted with water to the desired concentration for coating, usually from about 2 to about 25% solids.

The composition of the vinylidene chloride polymer latex which is employed as the heat sealable top coating material on the primer layer, is not critical to the practice of the invention. Commercially available vinylidene chloride latexes having a vinylidene chloride content of at least 50% and preferably from about 75% to about 92% may be employed. The other ethylenically unsaturated comonomers may include alpha, beta ethylenically unsaturated acids, such as acrylic and methacrylic acids; alkyl esters containing 1-18 carbon atoms of said acids, such as, methylmethacrylate, ethyl acrylate, butyl acrylate, etc. In addition alpha, beta ethylenically unsaturated nitriles such as acrylonitrile and methacrylonitrile can be employed. In addition monovinyl aromatic compounds such as styrene and vinyl chloride may be employed.

Specific vinylidene chloride polymer latexes contemplated comprise: 82% by weight vinylidene chloride, 14% by weight ethyl acrylate and 4% by weight acrylic acid. Alternatively, a polymer latex comprising about 80% by weight vinylidene chloride, about 17% by weight methyl acrylate and about 3% by weight methacrylic acid can likewise be employed. In addition, the heat seal composition described in U.S. Pat. No. 4,058,649, the disclosure of which is incorporated herein by reference in its entirety, can be employed.

The multiply structure of the present invention can have an overall thickness within a wide range, but is preferably from about 0.5 up to about 1.75 mils. in thickness. When the substrate is the homopolymer polypropylene it can have a film thickness of approximately one mil. In this instance the associated coextruded copolymer of ethylene and propylene can be present in a thickness of from about 0.02 to about 0.12 mils.

The primer dispersion, to be applied to the surface of the ethylene propylene copolymer, can have a solids concentration of from about 5% up to about 25%.

The primer dispersion can be applied to the surface of the ethylene propylene copolymer having utilizing standard coating techniques so that a dry coating weight of from about 0.05 up to about 0.25 gram/1,000 square inches of film is obtained. The thus coated film can be subsequently passed through a hot air oven to completely remove water and solvent. Subsequently this primer coated film can be coated with the selected vinylidene chloride polymer latex also using standard coating techniques such as graveur, roll coating, and the like. The vinylidene chloride polymer coated system can be thereafter dried by passing it through a conventional hot air oven.

The amount of vinylidene chloride polymer applied to the substrate film may be varied over a wide range depending upon the specific properties desired in the final film product. Coating weights of from about 1 to about 6 grams per 1,000 square inches may be employed. If a 2-sided coated film is desired, the beneficial corona treating of the ethylene propylene copolymer coated substrate, the priming and the vinylidene chloride polymer application can be repeated, either in line or out-of-line.

The method for producing the heat sealable multiple film structure of the present invention comprises:

coextruding a substrate layer comprising a polyolefin film with a layer consisting essentially of a random copolymer of ethylene and propylene on at least one side of said polyolefin substrate; said copolymer containing from about 0.5 to about 6% by weight of ethylene and about 94 to about 99.5% by weight of propylene;

biaxially orienting the coextrudate;

applying a primer coating to the surface of at least one random copolymer layer;

applying a heat sealable layer on said primer coating, said heat sealable layer comprising a vinylidene chloride copolymer containing at least 50% by weight of vinylidene chloride.

In the following examples a base film of homopolymer polypropylene coated with a primer layer and a heat seal layer is compared with a base film of the same homopolymer polypropylene having a copolymer layer thereon and the same primer layer and heat seal layer in association therewith. The overall thickness of the films tested is approximately one mil. The thickness of the ethylene propylene copolymer layer coextruded on to the homopolymer polypropylene layer is approximately 0.02 to 0.06 mils.

In the following examples the ESM heat seal test is a heat seal test designed to simulate conditions under which films might be sealed in a typical over-wrapping machine. For the test two strips of film are cut, three by fourteen inches, with the long direction being in the machine direction orientation of the film. The two strips of film are superimposed with coated surfaces, i.e., the polyvinylidene chloride polymer surfaces, in contact, and placed in a heat sealing machine with one movable heat sealing platen. On actuation, the heated platen lowers and contacts the film combination for a controlled period of time. The pressure used is that resulting from the force of a pressure cylinder set at about 5 psi and the time of contact is two seconds. A plurability of separate seals are simultaneously made on each strip of film. The film strips are cut one inch wide and the seal strengths are determined by placing the free ends of the film in the jaws of a Suter testing machine and pealing the seals apart at a rate of 20 inches per minute. The maximum force in grams is recorded as the heat seal strength.

Also, with respect to the following examples, a crimp seal test is carried out. It is designed to simulate conditions encountered in a device known in the industry as a "vertical form-and-fill" packaging machine. This type of machine, as indicated above, is designed to horizontally crimp seal across a tube of packaging material, dispense product into the tube, e.g., potato chips, and thereafter again horizontally crimp seal the opposite end of the tube to form a filled, sealed tubular package. Simultaneously with the seal the tube is severed. In the crimp seal test two heated platens with serrated surfaces are brought together by air pressure at 20 pounds per square inch on either side of the film strips for three-quarters of a second, then separated. Testing of the seals is carried out as above.

In the following examples, the base films, i.e., the homopolymer polypropylene of Example 1, the coextruded system of Example 2 and the polymer blend of Example 3, are all biaxially oriented by conventional means. In general, this includes forming the base film in sheet form and machine direction orienting (MDO) or stretching the same at the appropriate or optimum temperature, using transport rollers operating at different speeds. After the desired degree of MDO, the film is transversely direction oriented (TDO) for example, in a tentering apparatus, to impart an orientation or stretching which is at right angles to the MDO. The extent of orientation can be from about 3 to about 10 times its original dimension for the MDO and from about 3 to 10 times in the TDO.

For the base film of Example 2, the random ethylene propylene copolymer can be applied to the polypropylene after the polypropylene has been machine direction oriented. In this event, the copolymer will only be transversely oriented while the polypropylene is biaxially oriented. The techniques of U.S. Pat. Nos. 3,620,825 to Lohman and 3,671,383 to Sakata et al (the disclosures of which are incorporated herein in their entirety by reference) can be employed in this respect.

EXAMPLE 1

The acid catalyzed acrylic/melamine primer in accordance with the invention was made as follows:

| Acrylic Primer Latex | | |
|---|---|---|
| | Monomer Feed Composition (%) | 5 Liter Reactor Weight (g) |
| I. Monomer Feed | | |
| Methyl Acrylate (MA) | 60.0 | 510.0 |
| Methyl Methacrylate (MMA) | 30.0 | 255.0 |
| Hydrox/Ethyl Methacrylate (HEMA) | 7.0 | 59.5 |
| Epon 828 | 2.0 | 17.0 |
| Methacrylic Acid (MAA) | .5 | 4.3 |
| iso-Octylthioglycolate (iOTG) | .5 | 4.3 |
| Total | 100.0 | 850.1 |
| II. Reactor charge | | |
| | pphm (dry) | |
| DM H$_2$O (to make total solids 20%) | — | 3360.0 |
| (10%) Sodium Lauryl Sulfate | 0.20 | 17.0 |
| 5% Ammonium Persulfate (APS) | 0.25 | 42.5 |
| III. Procedure | | |
| A. Bring H$_2$O & Sodium Lauryl Sulfate to 80° C. | | |
| B. Add APS. | | |
| C. Hold 5 minutes. | | |
| D. Add monomer over two hours at 80° C. (or longer, if necessary to keep temp. at 80° C.) | | |
| E. Hold 30 min. | | |
| F. N$_2$ sparge 30 minutes. | | |
| G. Cool, filter. | | |

A biaxially oriented homopolymer isotactic polypropylene film of approximately one mil thickness was thereafter coated with the acid catalyzed acrylic/melamine primer as prepared above.

The primer dispersion is applied utilizing standard coating techniques to one side of the treated substrate base film so that a dry coating weight of from about 0.05 up to about 0.25 grams/1000 square inches of film is obtained. The coated film is subsequently passed through a hot air oven to completely remove the water and solvent present. Residence times from 1 to about 6 seconds in the oven at 200°-230° F. are usually sufficient to remove essentially all of the liquid phase. Subsequently, the film may be wound in a roll for storage before topcoating, or typically it may be coated "inline" by applying a topcoating such as a vinylidene chloride copolymer latex utilizing standard coating techniques such as gravure, roll coating, and the like. The topcoated film is subsequently dried by passing it through a conventional hot air oven.

The composition of the vinylidene chloride copolymer latex which is employed as a topcoating material is not critical to the practice of this invention. Commercially available vinylidene chloride latexes having a vinylidene chloride content of at least 50% and preferably from about 75% to about 92% may be employed. The other ethylenically unsaturated comonomers may include alpha, beta ethylenically unsaturated acids such as acrylic and methacrylic acids; alkyl esters containing 1-18 carbon atoms of said acids such as methyl methacrylate, ethyl acrylate, butyl acrylate, etc; alpha, beta ethylenically unsaturated nitriles such as acrylonitrile, methacrylonitrile; monovinyl aromatic compounds such as styrene; and vinyl chloride.

The amount of vinylidene chloride coating applied to the substrate film may be varied over a wide range depending upon the specific properties desired in the final film product. Coating weights of from about 1 up to about 6 grams per 1000 square inches may be used. If a two-sided coated film is desired the treating/priming/topcoating process can be repeated, either in-line or out of line.

In the following Table 1 data are presented on the anchoring effectiveness of the primer coating. The following is a description of the tests employed, as reported in the Table, to demonstrate the effectiveness of the primer composition of the present invention in achieving a moisture resistant bond between the vinylidene chloride multipolymer layer and the polypropylene substrate.

The dry coating weight of the primer material was equivalent to about 0.10 grams per 1,000 square inches of film. To the surface of the primer was applied a heat seal layer from an aqueous latex comprising a terpolymer resulting from the polymerization of about 82% by weight of vinylidene chloride, about 14% by weight of ethyl acrylate and about 4% by weight of acrylic acid. The aqueous latex also contained finely divided carnauba wax in the amount of 8 parts per 100 parts of the vinylidene chloride terpolymer. In addition, finely divided talc was included in the latex in the amount of 0.5 parts per 100 parts of the vinylidene chloride terpolymer. The coating was dried to yield a coating weight of approximately 2.6 grams per 1,000 square inches of film. Drying temperatures are important to develop improved heat seal strengths. Temperatures of at least 200° F. must be used, preferably 200° to about 300° F.

EXAMPLE 2

Example 1 was repeated except that the primer composition and heat seal composition were deposited onto the ethylene propylene copolymer surface of a coextruded biaxially oriented composite film of the same polypropylene as in Example 1 and an ethylene propylene random copolymer. The ethylene propylene copolymer contained approximately 3.5% by weight of ethylene and a melt flow of about 7.

The combined thickness of the coextruded film was approximately one mil with the ethylene propylene copolymer amount to approximately 6 percent of the total thickness.

ESM seals and crimp seals were formed in the multiply structures of Examples 1 and 2 and the comparative strength of these seals are shown in Table 1.

EXAMPLE 3

For this example a base material was prepared by melt blending into homopolymer polypropylene approximately 6% by weight of the ethylene propylene random copolymer utilized in forming the coextruded base film of Example 2. Thus, the base film in this example, contained approximately 94% by weight of homopolymer polypropylene and 6% by weight of the ethylene propylene random copolymer. The primer of Example 1 was applied directly to the surface of this base film and the vinylidene chloride terpolymer of Example 1 was applied to the primer. ESM seals and crimp seals were formed in the manner described above by placing the terpolymer surfaces of strips of this structure in face-to-face relationship. Table I below compares the strength of these seals (Example 3) with the same type of seal in Example 1 and Example 2.

TABLE I

| ESM Seals 5 psi; 2 Sec. Dwell (g/in.) | | | |
|---|---|---|---|
| | TEMPERATURE | | |
| | 230° F. | 250° F. | 270° F. |
| Example 1 | 295 | 310 | 355 |
| Example 2 | 440 | 515 | 560 |
| Example 3 | 270 | 260 | 275 |

It is seen that the strength of the seal of Example 2, at all seal temperatures, is considerably greater than the seals of Example 1 and Example 3 at the corresponding temperatures.

Although the present invention has been described with preferred embodiments, it is to be understood that modifications and variations may be resorted to without departing from the spirit and scope of this invention. Such variations and modifications are considered to be within the purview and scope of the appended claims.

What is claimed is:

1. A primer suitable for use in heat sealable films consisting essentially of a water-based acrylic/melamine system consisting of the reaction product of an acrylic emulsion interpolymer, a water-soluble partially alkylated melamine formaldehyde resin curing agent, and a suitable acid catalyst.

2. The primer of claim 1 wherein the acrylic moiety of said acrylic emulsion interpolymer is derived from the group consisting of methyl acrylate, methylmethacrylate and hydroxyethyl methylmethacrylate.

3. The primer of claim 1 wherein the curing agent is a water soluble partially alkylated ($C_1$-$C_6$) melamine formaldehyde resin.

4. The primer of claim 3 wherein said melamine is partially methylated.

5. The primer of claim 1 wherein said acid catalyst is selected from the group consisting of phosphoric, hydrochloric, sulfuric, acetic and sulfonic acids or salts thereof.

6. The primer of claim 5 wherein the acid catalyst is para-toluene sulfonic acid.

* * * * *

UNITED STATES PATENT AND TRADEMARK OFFICE
CERTIFICATE OF CORRECTION

PATENT NO. : 4,794,136

DATED : December 27, 1988

INVENTOR(S) : R. E. Touhsaent

It is certified that error appears in the above-identified patent and that said Letters Patent is hereby corrected as shown below:

Col. 4, Line 60, Delete "having" insert --layer--.
Col. 4, Line 8, Delete "here" insert --herein--.

Signed and Sealed this

First Day of January, 1991

*Attest:*

HARRY F. MANBECK, JR.

*Attesting Officer*    *Commissioner of Patents and Trademarks*